US006817894B2

(12) United States Patent
Sanner et al.

(10) Patent No.: US 6,817,894 B2
(45) Date of Patent: Nov. 16, 2004

(54) APPARATUS FOR AIRCRAFT SEAT CONNECTOR INTERFACE TO PORTABLE ELECTRONIC DEVICES

(75) Inventors: Scott Carleton Sanner, Kent, WA (US); Drew A. Pappas, Yorba Linda, CA (US); Donald B. Lee, Shoreline, WA (US); John L. Madera, Renton, WA (US)

(73) Assignee: The Boeing Company, Chicago, IL (US)

( * ) Notice: Subject to any disclaimer, the term of this patent is extended or adjusted under 35 U.S.C. 154(b) by 52 days.

(21) Appl. No.: 09/998,069

(22) Filed: Nov. 30, 2001

(65) Prior Publication Data

US 2003/0054687 A1 Mar. 20, 2003

Related U.S. Application Data

(63) Continuation-in-part of application No. 09/955,919, filed on Sep. 19, 2001.

(51) Int. Cl.[7] .................................................. H01R 13/60

(52) U.S. Cl. ......................... 439/535; 439/34; 439/131; 439/540.1

(58) Field of Search ............................. 439/64, 36, 34, 439/503, 535, 540.1, 131

(56) References Cited

U.S. PATENT DOCUMENTS 5,137,321 A * 8/1992 Landry et al. ............. 296/24.1
5,311,302 A * 5/1994 Berry et al. ............. 348/14.03
5,570,002 A 10/1996 Castleman
5,790,787 A 8/1998 Scott et al.
5,835,127 A 11/1998 Booth et al.
6,016,016 A 1/2000 Starke et al.
6,034,688 A * 3/2000 Greenwood et al. ........ 345/784
6,038,426 A * 3/2000 Williams, Jr. ................ 725/77
6,315,618 B1 * 11/2001 Francis ....................... 439/676

OTHER PUBLICATIONS

U.S. patent application: Methods and Apparatus For Distributing Electrical Power; Ser. No. 09/943,124, Filing Date: Aug. 30, 2001, pp. 1–17.

Copy of PCT International Search Report dated Jan. 14, 2003.

“ARINC Series, ARINC 628 In–Seat Power Connectors”, http://www.hypertronics.com/catalog2001/a__series/index.html, 1 page, plus 2 additional pages of PDF filed linked from page, Jul. 10, 2001.

“The SmartAdapter, FAQ’s—Frequently Asked Questions”; http://www.nescobatteries.com/safaq.html, 5 pages, Jun. 26, 2000.

“The SmartAdapter, Operating & Setup Instructions”; http://www.nescobatteries.com/sainstructions.html, 8 pages, Jun. 26, 2000.

(List continued on next page.)

*Primary Examiner*—P. Austin Bradley
*Assistant Examiner*—James R. Harvey
(74) *Attorney, Agent, or Firm*—Harness, Dickey & Pierce, P.L.C.

(57) ABSTRACT

A connector module for connecting a portable electronic device to a power source and a network on-board a mobile platform, for example an aircraft. The connector module is adapted to be integrated into an interior compartment of the aircraft, either adjacent to or disposed within a seat of the aircraft. The connector module provides a networking port disposed within a housing that is adapted to couple the portable electronic device to the aircraft network. A power port is also disposed within the housing of the connector module and is adapted to receive either a DC or AC power cable of the portable electronic device for providing power to the portable electronic device. Several embodiments of the connector module provide various configurations for integrating the connector module into the compartment of the aircraft and/or into the seat of the aircraft.

13 Claims, 9 Drawing Sheets

Outbd 350 352 354 356 358 360 372 374 I I 368 362 370 364 378 376 366

OTHER PUBLICATIONS

"One Power Adapter Does It All, The Smart/Adapter", http://www.nescobatteries.com/safrontpage.html, 1 page, Jun. 20, 2000.

"The SmartAdapter+, Technical Specifications"; http://www.nescobatteries.com/saspecifications.html, 2 pages, Jun. 26, 2000.

"The SmartAdapter, Features & Benefits"; http://www.nescobatteries.com/safeataures.html, 3 pages, Jun. 26, 2000.

Cigarette Lighter Power Splitter 3, Communications Electronics, Inc., http://www.usacan.com/files/ps3.html; 1 page from on–line catalog, Copyright 1996–2001.

* cited by examiner

15VDC Power Connector
RJ45
USB
ARINC 628
Power Regulator
Power Source
RJ45 Interface
USB Interface
Server
14
16
18
20
10
12
22
24
26
28
30

50
52
54
56
58
60
62
10
10

52
80
12
18
20
16
10

50
58

10
20
28
12
16
54
58
52
16
28
20
10
12
62

104
106
100
102
54
108
52

54
110
112
10
20
52
18
16

58
200
54
52
206
204
202

352
354
Outbd
350
356
358
360
372
374
I
I
368
362
370
364
378
376
366
A
374
372
380
382
388
368
Stowed
Deployed
300
C
Fwd
B

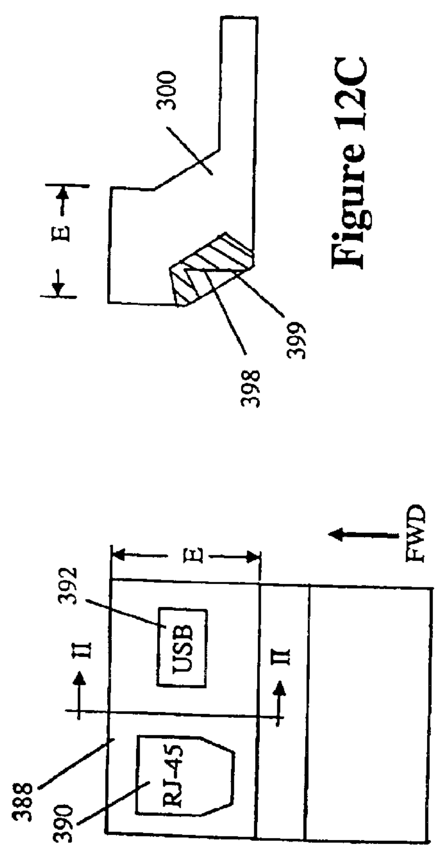
Figure 12C
Figure 12A
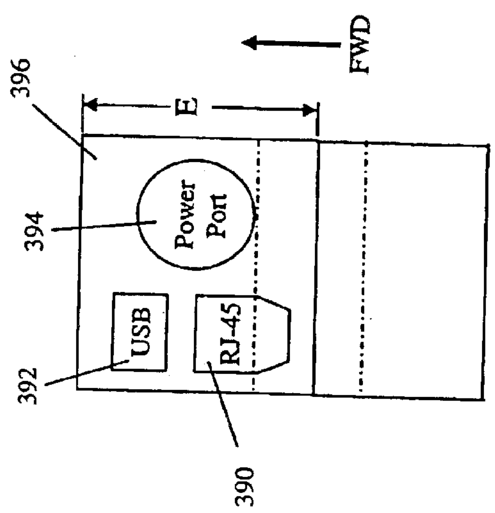
Figure 12B 394
110VAC Power Connector
390
RJ45
USB
392
ARINC 628
300
370
22
Power Regulator
24
Power Source
26
RJ45 Interface
28
USB Interface
30
Server

APPARATUS FOR AIRCRAFT SEAT CONNECTOR INTERFACE TO PORTABLE ELECTRONIC DEVICES

CROSS REFERENCE TO RELATED APPLICATION

This application is a continuation-in-part of pending U.S. patent application Ser. No. 09/955,919, filed Sep. 19, 2001. The disclosure of the above application is incorporated herein by reference.

FIELD OF THE INVENTION

The present invention relates generally to interfaces for electronic devices and specifically to an aircraft seat connector interface for portable electronic devices.

BACKGROUND OF THE INVENTION

Airline passengers frequently bring on-board an aircraft their portable electronic devices including laptop computers, hand-held computers and cellular telephones or pagers with Internet access capability. These various electronic devices can be used by passengers to perform a wide variety of computing operations including reviewing web pages, gathering information, creating documents and performing other work or leisure related activities. These devices are convenient for use during a commercial air flight where several hours can pass between destinations. Due to the proliferation of electronic devices, systems have developed to integrate their use in areas where they have not been fully utilized, such as on commercial aircraft.

For commercial aircraft, greater utilization has developed by first integrating a network in the commercial aircraft to allow for connecting the computerized devices to the network in order to access additional services. An example of an aircraft based network is "Connexion By Boeing$^{SM}$". Connexion By Boeing$^{SM}$ is a consumer and commercial airline service that offers high-speed data communication services through a space-based network. The system offers air travelers high-speed intranet, email, and Internet services while in-flight. To use these services, a passenger connects their electronic device to a network on the aircraft that in turn places the user's electronic device in communication, via a space based communication link, with a ground based component of the system.

Electronic devices, however, require power for operation and connectivity to a network in order to access additional services or resources such as the Connexion By Boeing$^{SM}$ system. While many portable electronic devices come with battery power as an optional power source, batteries have a limited charge life span that may be shorter than some commercial flights.

Network connectivity also poses problems in how it is implemented. For example, not all network connectivity solutions conform with Federal Aviation Association (FAA) requirements for use on-board a commercial aircraft. Therefore, there is a need for a system which allows passengers and crew members who bring an electronic device on-board commercial aircraft to easily connect their electronic device to a power source and/or to a network located on the aircraft.

It is therefore an object of this invention to provide a system for connecting electronic devices to a power source and to a network on an aircraft. It is a further object to provide a system that is convenient and practical for use in an on-board commercial aircraft environment. An additional object is to allow for connectivity of electronic devices with differing power and network connection capability or requirements.

SUMMARY OF THE INVENTION

According to the invention, there is provided a connector module in accordance with a preferred embodiment for connecting an electronic device to a power source and a network. The connector module is integrated into an interior compartment of the aircraft and may be adjacent to or disposed within a seat of the aircraft. The connector module comprises a housing with a networking port and a power port disposed within the housing. The networking port is of the type that can connect an electronic device to a network for providing network connectivity of the electronic device. The power port is of the type that will receive a power cable attached to the electronic device for providing power to the electronic device. Several preferred embodiments of the invention are disclosed which reflect differing placements and configurations of the connector module.

In a preferred embodiment, the housing of the connectivity module is attached to the underside of the seat. The lower half of the connectivity module tilts forward and up to allow for connection with the electronic device. In another preferred embodiment, the connector module is connected to an armrest of the seat. In another preferred embodiment, the connector module is located on the back of the seat in front of the passenger that would use the connector module. In another preferred embodiment, the connector module is disposed on a flexible tube or pipe that can be articulated up from between two seats. In another preferred embodiment, the connector module is attached to a retractable module secured to the back of a seat in front of the passenger that will use the connector module. Alternatively, the connector module is located under the seat span on which the passenger is seated that will use the connector module. In another preferred embodiment, the connector module is located below an armrest and between two adjacent seats.

In yet another preferred embodiment of the invention, the connector module is provided in a housing, movably attached preferably to the outboard underside of each seat. The module translates forward from a stowed position on the underside of the seat to a deployed position, the deployed position allowing access for connection with the user's electronic device. The module is mechanically attached to the under side seat frame preferably using a sliding drawer type mechanism.

The sliding drawer mechanism positions the connector module in the deployed, fully extended position with the connectors facing upward and all the connectors visible to a user sitting in the seat. In addition to RJ-45 and USB connectors, an additional version also preferably employs a 110 volt AC power port for power connection to the user's portable electronic equipment.

The connector module provides easy and convenient connectivity for most electronic devices. It accomplishes this by providing connectivity to a network via both an RJ-45 jack and a universal serial bus (USB) port. In addition to the 110 volt AC outlet noted above, the connector module may also offer one or two power connectivity options including a 15 volt DC half inch connector (i.e., a cigarette lighter connector) or an ARINC 628 connector.

In operation, a passenger or crew member brings their electronic device, for example, a laptop computer, on-board an aircraft. The laptop computer is connected to the connector module by connecting a cable from a networking port on the laptop computer to either the universal serial bus (USB) or RJ-45 jack of the connector module. The laptop computer may also be connected to the power source by connecting a cable from the laptop computer power port to the power port of the connector module. When connected, the laptop computer has access to the on-board aircraft network and to either a DC or AC power source.

BRIEF DESCRIPTION OF THE DRAWINGS

The present invention will become more fully understood from the detailed description and the accompanying drawings, wherein:

FIGS. 12A and 12B are perspective views of the connector module of FIG. 9 identifying two and three connector versions respectively;

FIG. 12C is a side elevation view taken along section II-II of FIG. 12A;

DETAILED DESCRIPTION OF THE PREFERRED EMBODIMENTS

The following description of the preferred embodiment(s) is merely exemplary in nature and is in no way intended to limit the invention, its application, or uses.

Figure 1:
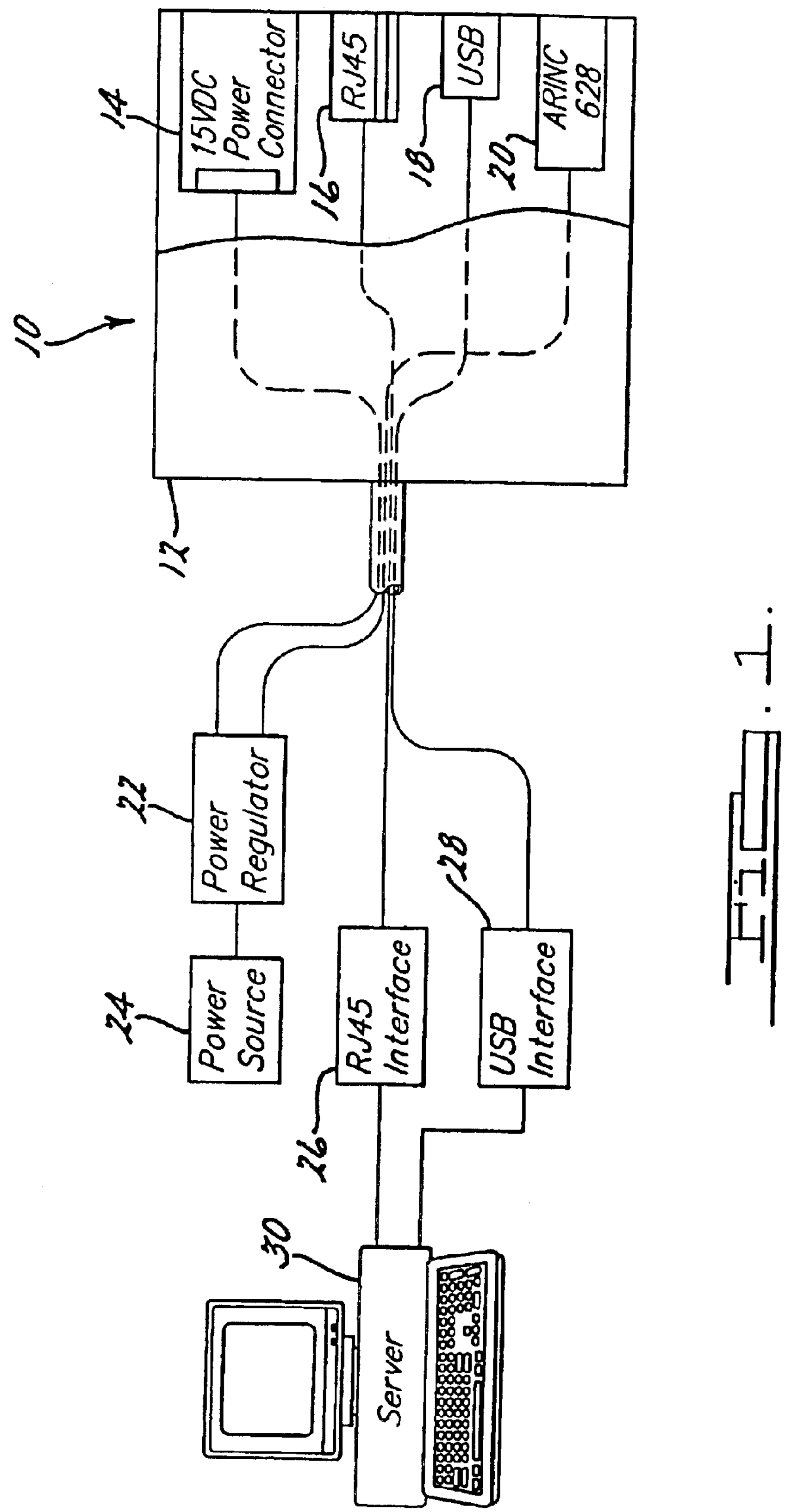
FIG. 1 is a simplified block diagram illustrating the connector module of the present invention in communication with an on-board server located on a mobile platform such as an aircraft.

In FIG. 1, a connector module 10 in accordance with a preferred embodiment of the present invention is shown. The connector module 10 comprises a housing 12 and a plurality of network and power connectors. The connector module 10 is illustrated with a 15 volt DC power connector 14, an RJ-45 network connector 16, a universal serial bus connector (USB) 18, and an ARINC 628 power connector 20 disposed within the housing 12. The 15 volt DC power connector 14 (i.e., a cigarette lighter connector) is a female connector suitable for receiving a male 15 volt DC power connector attached by cabling to an electronic device. The RJ-45 interface 26 is a female receptacle suitable for connecting to a male RJ-45 connector attached by cabling to the electronic device. The USB interface 28 is a female interface suitable for receiving a male USB interface connector attached by cabling to the electronic device. The ARINC 628 power connector 20 is a female connector suitable for receiving a corresponding male ARINC 628 connector attached by cabling to the electronic device.

Both the 15 volt DC power connector 14 and the ARINC 628 power connector 20 are connected to a power regulator 22 for providing suitable power to each power connector. The power regulator 22 is connected to a power source 24. The power source 24 provides power to the 15 volt DC connector 14 and the ARINC 626 power connector 20, that in turn provide power to the electronic device.

The RJ-45 connector 16 is connected to an RJ-45 interface 26. The RJ-45 interface 26 is connected to an on-board server 30 located on the mobile platform, in this example an aircraft, for providing network connectivity to any electronic device attached to the connector module 10. Similarly, the USB connector 18 is connected to a USB interface 28. The USB interface is connected to the server 30. Thus, the USB connector 18 also provides network connectivity for an electronic device.

Figure 2:
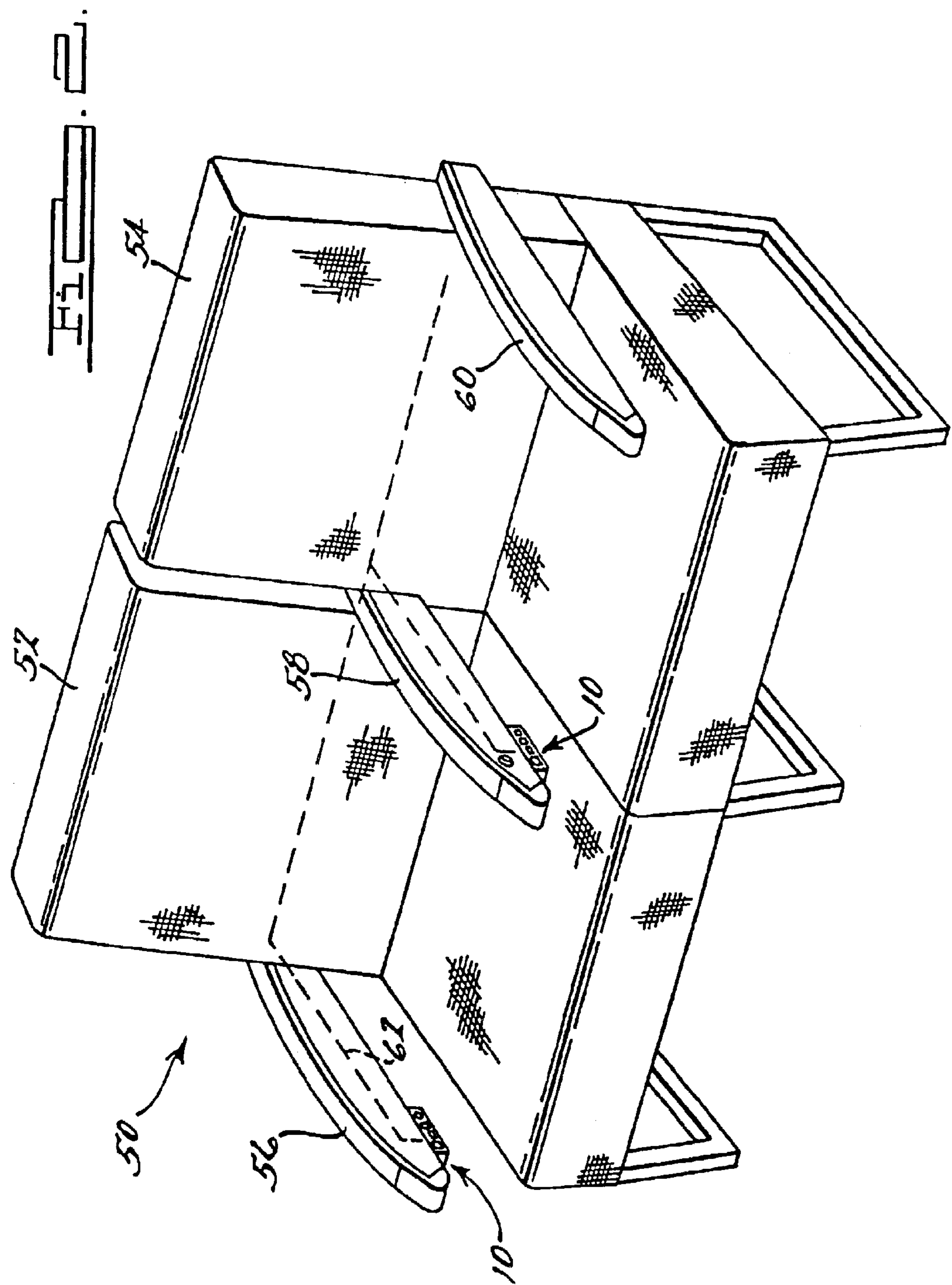
FIG. 2 is a perspective view of the connector module of FIG. 1 disposed in the armrests of two exemplary seats of an aircraft.

Referring to FIG. 2, the connector module 10 is shown disposed within an aircraft seat assembly 50. The aircraft seat assembly 50 is illustrated as having a first seat 52 and second seat 54 with a first armrest 56, a second (middle) armrest 58, and a third armrest 60. Separate connector modules 10 are disposed within each of the first armrest 56 and second (middle) armrest 58. This allows passengers to sit in both the first seat 52 and second seat 54 and connect their electronic devices to their associated connector module 10. Cabling 62 connects the connector module 10 in the first armrest 56 and the connector module 10 in the second (middle) armrest 58 to the power source 24 and to the server 30.

Figures 3, 4, 5:
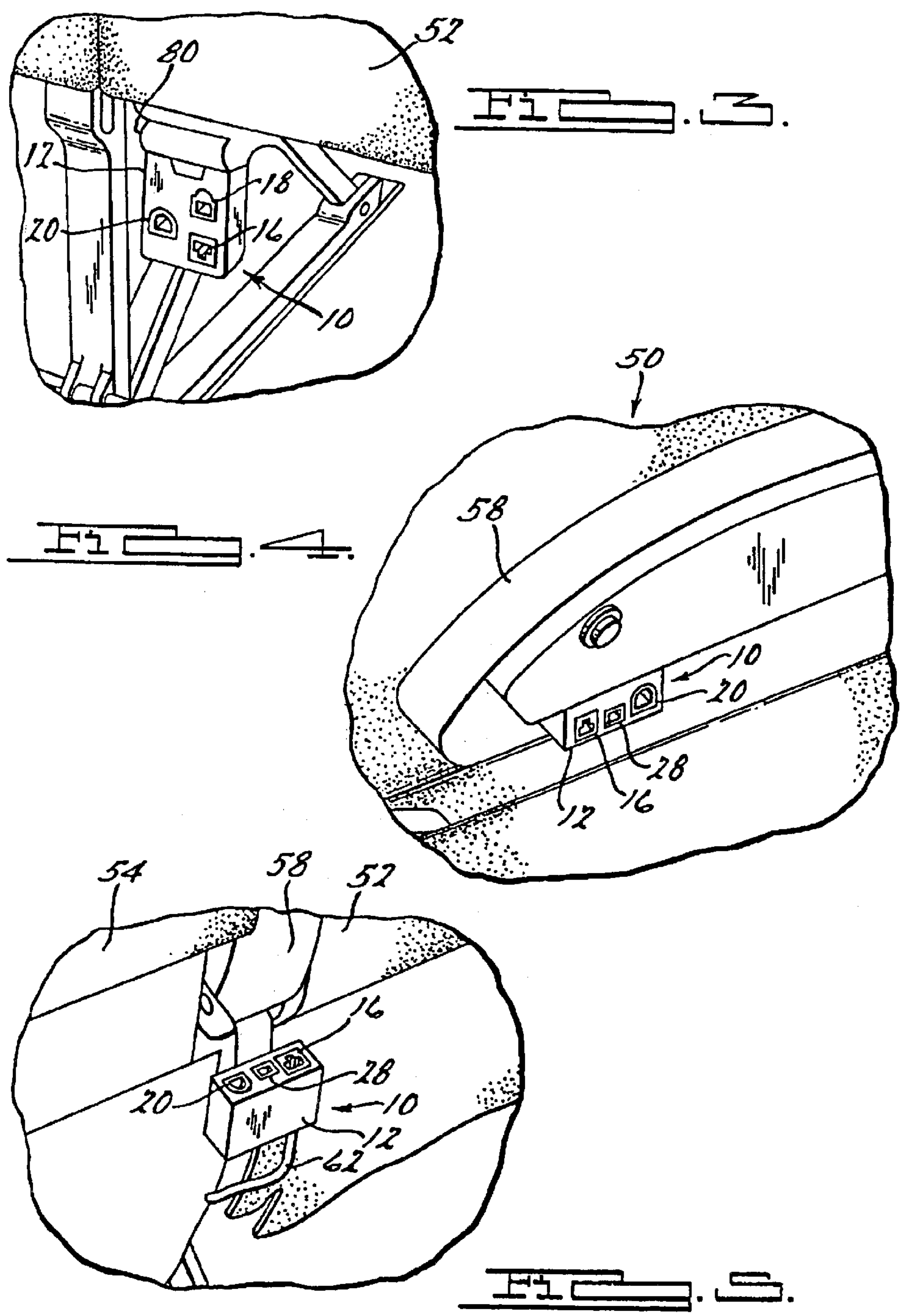
FIG. 3 is a perspective view of a preferred embodiment of the connector module of FIG. 1 disposed in the rear underside of one of the seats illustrated in FIG. 2.
FIG. 4 is a perspective view of the aircraft seat of FIG. 2 with a preferred embodiment of the connector module disposed within the armrest of the seats.
FIG. 5 is a perspective view of the back of one of the seats of FIG. 2 with a preferred embodiment of the connector module connected to the seat back.

Now referring to FIG. 3, the first embodiment of the connector module 10 is shown attached to the bottom aft portion of a seat such as the first seat 52. The connector module 10 and the housing 12 are pivotably attached to a pivot base 80 for allowing the connector module to be rotated forward to aid in connecting the connector module to the electronic device. In the first preferred embodiment, the connector module 10 has the USB connector 18, the RJ-45 network connector 16, and the ARINC 628 power connector 20 disposed within the housing 12.

Referring to FIG. 4, the connector module 10 is illustrated attached to an armrest such as the second (middle) armrest 58 of the aircraft seat assembly 50.

Referring to FIG. 5, the connector module 10 is shown supported on the aft side and middle of the first seat 52 and the second seat 54.

Figures 6, 7, 8:
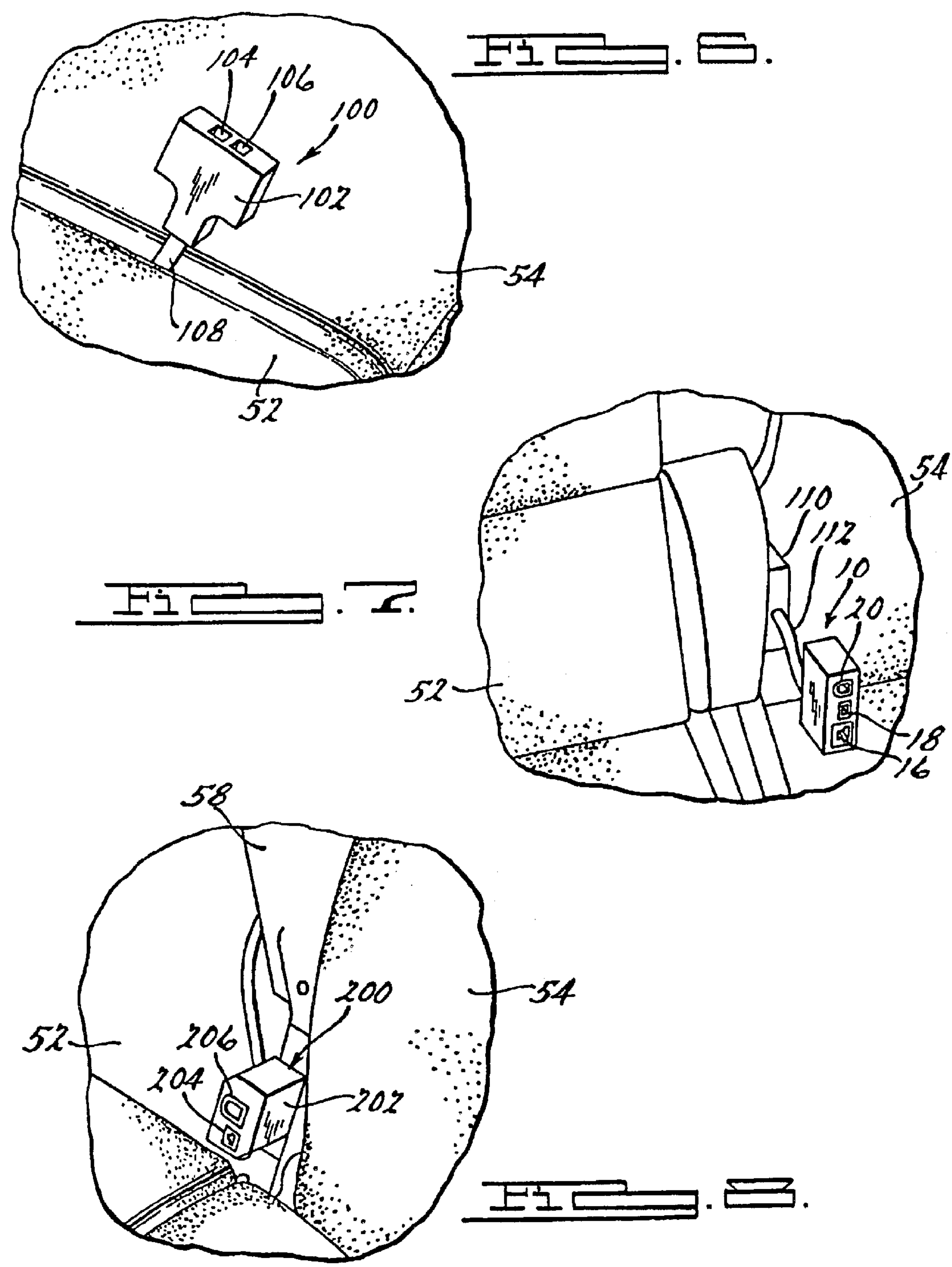
FIG. 6 is a perspective view of the front cushions of the seats in FIG. 2 with a preferred embodiment of the connector module of FIG. 1 disposed between the two seat cushions.
FIG. 7 is a perspective view of the aft side of the seats of FIG. 2 with a preferred embodiment of the connector module disposed therein.
FIG. 8 is a perspective view of the seats of FIG. 2 with a preferred embodiment of the connector module between the two seats underneath the middle armrest.

Now referring to FIG. 6, an alternative preferred embodiment 100 of the invention is shown which only includes a housing 102, RJ-45 connector 104 and a power connector 106. The connector module 100 is attached to a cable 108 and disposed between the first seat 52 and second seat 54. With this embodiment, the connector module 100 can advantageously be rotated up from between the first seat 52 and the second seat 54 for connecting to the electronic device before being placed back between the seat cushions while connected.

Now referring to FIG. 7, the connector module 10 is shown disposed on the aft side of the second (middle) armrest 58. In this embodiment, the connector module 10 is connected to a base housing 110 that is connected to the second (middle) armrest 58. The base housing 110 is connected to the connector module by a connector cable 112. In a variation on this embodiment, the base housing 110 may contain a retraction mechanism for allowing the connector cable 112 to be retracted into the base housing 110.

Now referring to FIG. 8, another preferred embodiment of the invention illustrates a connector module 200 having a housing 202, an RJ-45 network connector 204 and a power connector 206. The connector module 200 is shown disposed between the first seat 52 and second seat 54 connected beneath the second (middle) armrest 58.

Figures 9, 10:
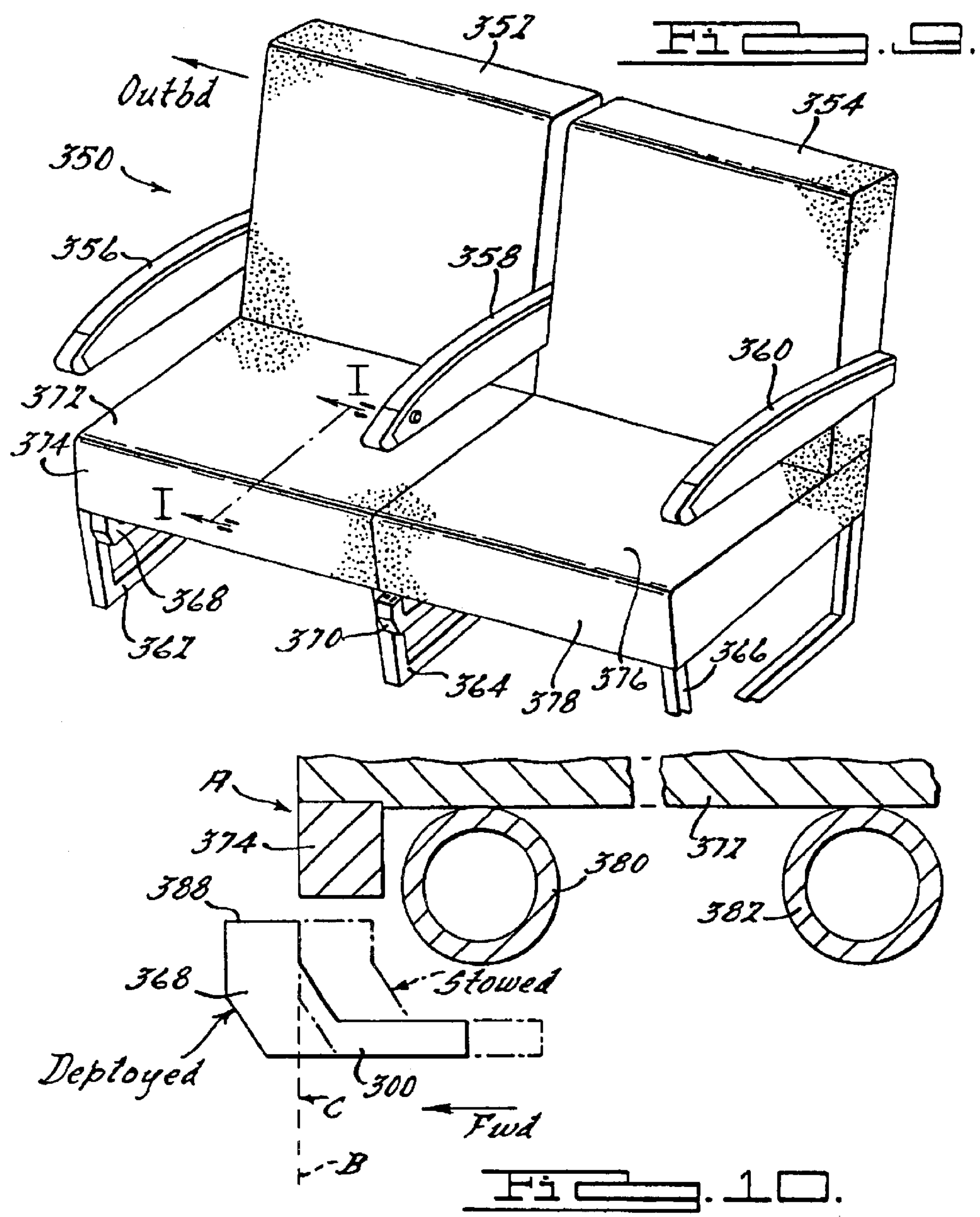
FIG. 9 is a perspective view of the connector module disposed on the outboard underside of two exemplary seats of an aircraft.
FIG. 10 is a side elevation view taken through section I-I of FIG. 9, showing the connector module in both a stowed (phantom) and a fully deployed position.

Referring to FIG. 9, seat assembly 350 is shown, similar to seat assembly 50 of FIG. 2. Seat assembly 350 comprises first seat 352 and second seat 354, wherein first seat 352 is the outboard seat. First armrest 356, second armrest 358, and third armrest 360 are also shown. A first seat leg 362 supporting the outboard side of first seat 352 is provided. Second (middle) seat leg 364 supports both first seat 352 and second seat 354, and third (inboard) seat leg 366 supports the inboard side of second seat 354. First seat 352 has a first seat bottom cushion 372 and a first seat front beam 374. Second seat 354 has a second seat bottom cushion 376 with its corresponding second seat front beam 378. A first connector module 368 is shown on the outboard section of first seat 352, under first seat front beam 374 and immediately adjacent to first seat leg 362. A corresponding second connector module 370 is similarly shown at the outboard portion of second seat 354, under second seat front beam 378 and immediately adjacent second (middle) seat leg 364. The first connector module 368 is shown in its stowed position and the second connector module 370 is shown in its deployed position. A two connector module is shown in both positions of FIG. 9.

Referring now to FIG. 10, an elevation view of first seat 352 taken through section I—I of FIG. 9 is shown. First seat bottom cushion 372 and first seat front beam 374 are shown supported by forward seat tube 380 and aft seat tube 382, respectively. A connector module body 300, comprising first connector module 368 and its associated mounting mechanism (not shown), is shown in both its stowed position and its deployed position. In the deployed position of first connector module 368, connector module top face 388 becomes accessible. Connector module top face 388 has the system connectors disposed thereon. As shown in FIG. 10, when a connector module body 300 is in its deployed position, visual access to the connectors on the connector module top face is provided to a user of the seat.

FIG. 10 also shows that in the stowed position (phantom view), first connector module 368 is positioned completely under first seat front beam 374. The stowed position is within a “footprint” of the seat. The footprint comprises the area under the seat, bounded on the seat forward face A such that a phantom line B drawn vertically downward from the forward faces of both first seat bottom cushion 372 and first seat front beam 374 forms the footprint forward edge C. In the stowed position, a connector module body 300 is completely positioned aft of footprint forward edge C. In the deployed position, at least the connector module top face 388 is fully extended forward of footprint forward edge C (forward of phantom line B). In this position, a user will have visible (i.e., line-of-sight) and physical access to the connectors mounted on connector module top face 388. FIG. 10 is exemplary, as a connector module body 300 mounted to a different seat, ie. second seat 354, will provide the same mounting characteristics, in both deployed and stowed positions.

The stowed position of connector module body 300 provides clearance for ingress and egress for passenger (or any person) access to a seat and prevents damage to the connector module body 300. Also, in the stowed position of connector module body 300, a passenger has uninterrupted leg space forward of footprint forward edge C. As evident, the size of a connector module body 300, even in the deployed position, has minimal impact on a seat occupant’s leg space.

Figure 11:
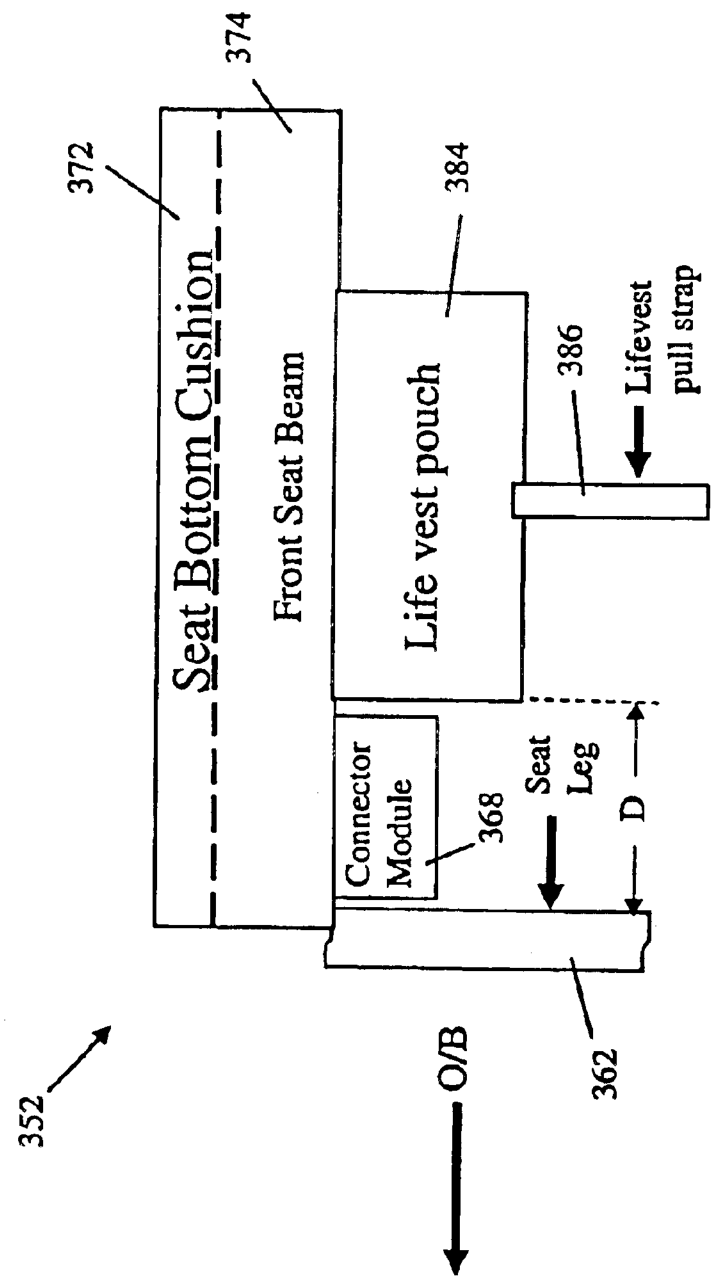
FIG. 11 is a front elevation view looking aft showing the location of the connector module of FIG. 9 between a typical seat leg and stowed life vest pouch.

Referring to FIG. 11, portions of first seat 352 are shown, including first seat bottom cushion 372, first seat front beam 374, and first seat leg 362. FIG. 11 depicts a seat orientation viewed from the forward facing side of the seat looking aft. In FIG. 11, life vest pouch 384 and life vest strap 386 are shown. The life vest and life vest strap are included in aircraft providing extended flight services. First connector module 368 is shown in its position adjacent to both first seat leg 362 and life vest pouch 384. As evident in FIG. 11, the connector module(s) must be positioned to fit within existing constraints of the aircraft seats. Space envelope D represents the width available between a seat leg and the life vest pouch, within which the connector module (including necessary mounting mechanism envelope) must fit.

Referring to FIGS. 12A and 12B, two versions of a connector module body 300 are shown. FIG. 12A provides two system connectors, RJ-45 connector 390, and USB connector 392, both mounted on connector module top face 388. In another version of the invention, FIG. 12B shows a third connector, 110-volt AC or 15-volt DC power connector 394, provided together with RJ-45 connector 390 and USB connector 392, on expanded connector module top face 396. Due to the width restraint D, shown in FIG. 11, imposed between the seat leg and life vest pouch, expanded connector module top face 396 provides additional space for 110-volt AC power connector 394 by also increasing a fore-aft depth E of the top face surface.

FIG. 12C is an elevation view of an exemplary connector module. FIG. 12C shows a partial view taken along Section II—II, FIG. 12A, of a manual pull feature 398, which in this version comprises an indentation within connector module forward face 399 of connector module body 300. Manual pull feature 398 may also comprise an extension (not shown) of connector module forward face 399.

The mechanism for mounting a connector module body 300 (not shown) preferably comprises a sliding drawer type frame, wherein a first end of the frame would be connected to seat structure, such as first seat front beam 374 or forward seat tube 380. A second end of the frame would allow the connector module body 300 to be movably connected such that connector module body 300 can be translated between the stowed position and the deployed position. The type of mechanism used is required to fit, together with connector module body 300, within the space envelope identified in FIG. 13.

Figure 13:
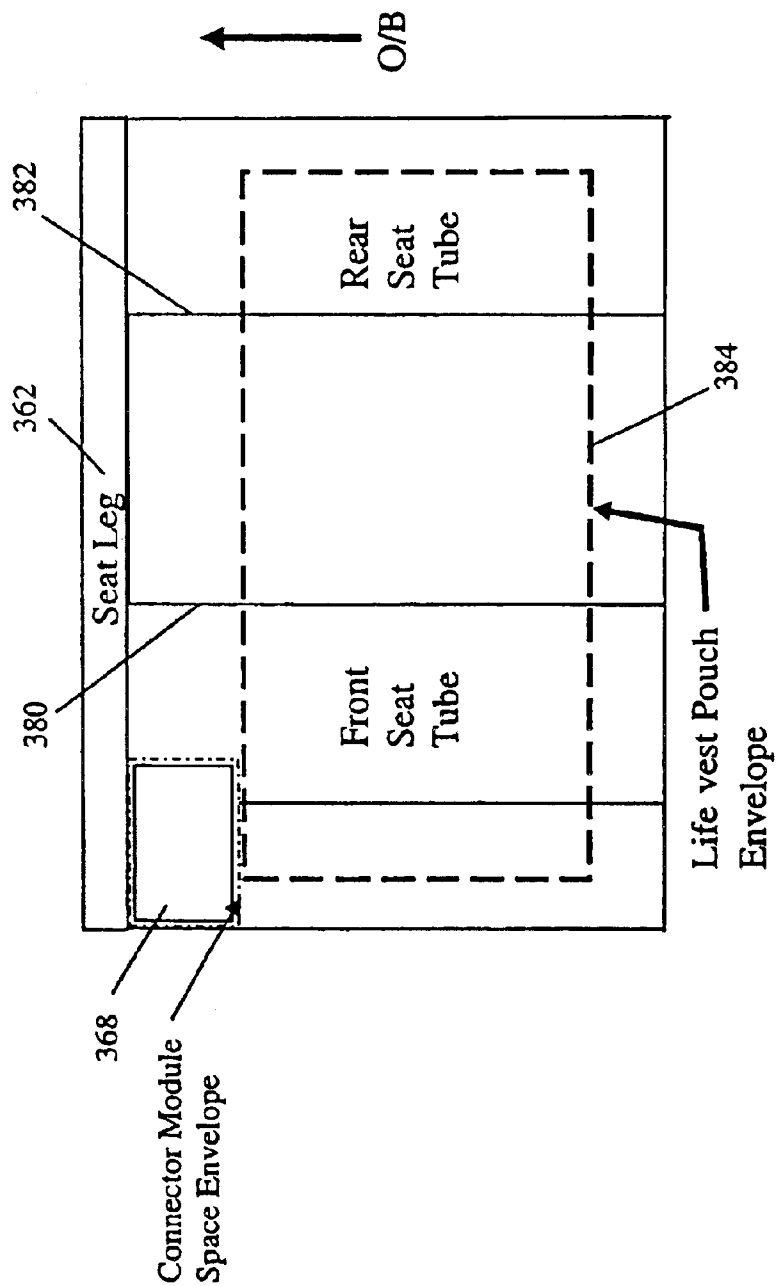
FIG. 13 is a plan view of an exemplary aircraft seat showing the connector module positioned relative to the adjacent life vest pouch and front seat tube.

Referring to FIG. 13, a plan view is provided of an exemplary aircraft seat showing the stowed location of life vest pouch 384, the forward seat tube 380, the aft seat tube 382, and the first seat leg 362. First connector module 368 is shown in this view in a stowed position. FIG. 13 also shows that a portion of first connector module 368 may extend beyond a portion of forward seat tube 380.

Figure 14:
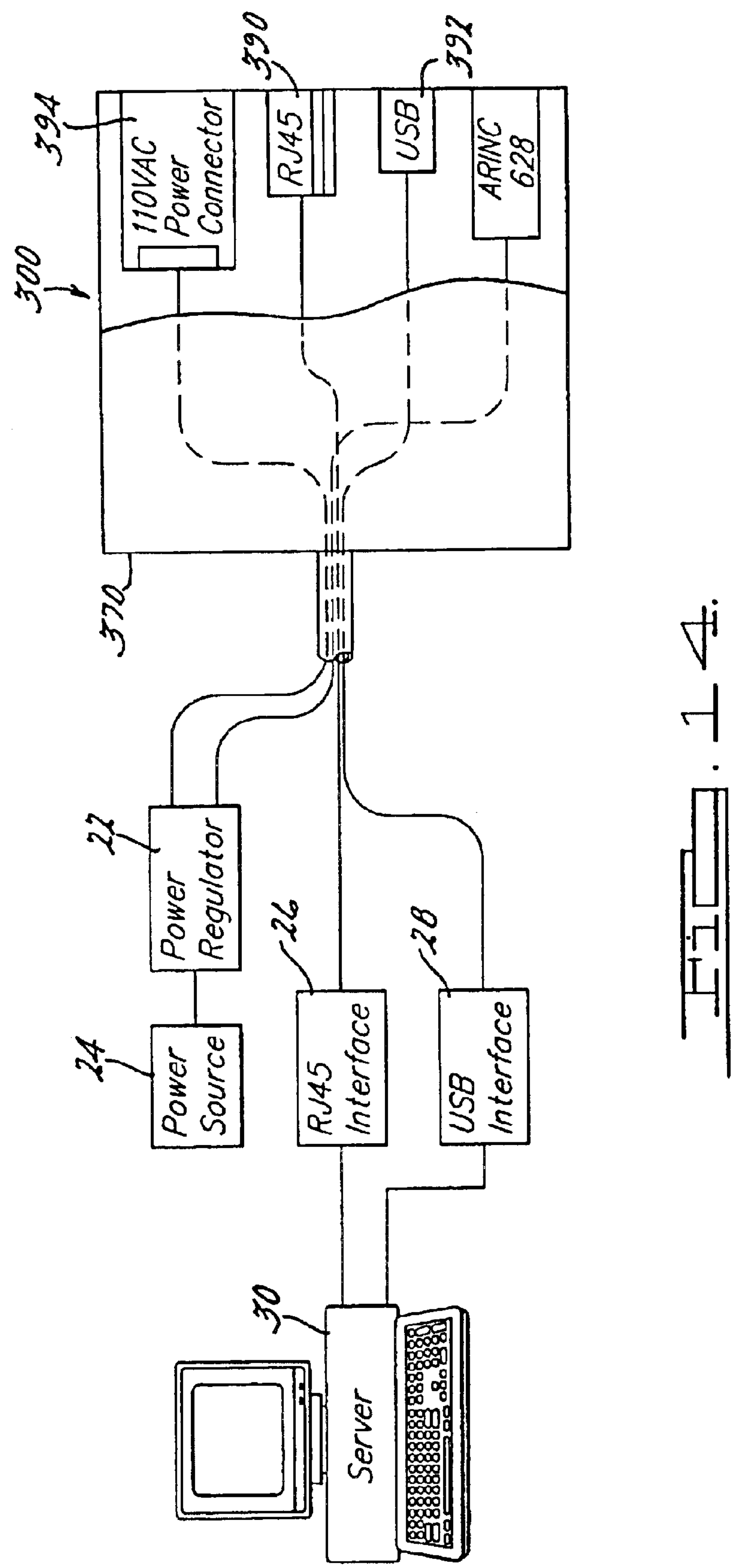
FIG. 14 is a simplified block diagram illustrating another version of the connector module of the present invention in communication with an on-board server located on a mobile platform such as an aircraft.

Referring to FIG. 14, and similar to the connections of FIG. 1, a connector module body 300 in accordance with another version of the present invention is shown. The connector module body 300 comprises a housing 370 (368 is similar providing only 2 connectors) and a plurality of network and power connectors. The connector module body 300 is illustrated with a 110 volt AC power connector 394, an RJ-45 network connector 390, and a universal serial bus connector (USB) 392. RJ-45 connector 390 is connected to RJ-45 interface 26. The RJ-45 interface 26 is connected to on-board server 30 located on the mobile platform, in this example an aircraft, for providing network connectivity to any electronic device attached to first connector module 370. Similarly, USB connector 392 is connected to USB interface 28. The USB interface is connected to the server 30. Thus, the USB connector 392 also provides network connectivity for an electronic device. The 110 volt AC power connector 394 is a female connector suitable for receiving a male 110 volt AC power connector attached by cabling to an electronic device.

Data connector modules mounted in a movable module assembly of the present invention require hardware and fasteners (not shown). Material for the drawer, the mounting hardware, and the fasteners may be selected from commonly available materials, such as aluminum, steel, stainless steel, and others. Wiring to the connector module body is provided by existing coiled cabling provided to the underside of seats in current configurations. Flexible wiring connections, such as wiring loops, are provided to the connector module to allow for connector module motion from its stowed to its extended position. Other methods of providing flexibility for wiring and/or cabling connections to the connector modules may be provided. The advantages of a connector module, translatable between a stowed and a deployed position by employing a sliding drawer or similar type mechanism are as follows: 1) the connector module is located in a low position attached directly to the seat and deployed such that the user can visually identify the desired connector type prior to making the connection; 2) for aircraft application, the connector modules are located within existing restraints of the seat design including life vest pouches and existing seat legs; 3) wiring connections for the connector modules are provided from existing seat wiring extended to the connector module area; and 4) in a stowed position, the connector modules are out of the way of a passenger entering or leaving the seating area or a passenger who is not using a module.

It should be appreciated that while the several preferred embodiments are illustrated with various combinations of power connectors such as the 15 volt DC power connector 15, 110 volt AC power connector 394, or the ARINC 628 power connector 20, and a network connector such as the RJ-45 network connector 16, the RJ-45 network connector 390, or the universal serial bus connector 18 or the universal serial bus connector 392, there can be several different combinations of these connectors disposed within the connector module of the present invention. The various preferred embodiments of the connector module of the present invention, and the ability to easily adapt the connector module for mounting adjacent various areas of a seat of mobile platform, thus allows users to easily connect their personal computing device to a control network on the mobile platform. The connector module of the present invention is unobtrusive and yet easily accessible by users, and does not require significant modifications to existing seat assemblies in mobile platforms such as aircraft.

The description of the invention is merely exemplary in nature and, thus, variations that do not depart from the gist of the invention are intended to be within the scope of the invention. Such variations are not to be regarded as a departure from the spirit and scope of the invention.

It is anticipated that a connector module employing a movable mechanism such as a sliding drawer design is employed using either a self retracting feature or a manually retracting feature such that if the self retracting feature is employed, upon completion of use, the drawer slides back into its stowed position automatically. A variety of alternate mechanisms to provide either the manual or the self retracting feature may be employed, including a hinged design, a pin and clevis design or reduced friction material pads within a channel, without departing from the spirit and scope of the invention.

Movable connector modules such as shown in FIG. 9 are preferably attached to outboard portions of each respective seat. Alternately, the connector modules may be positioned on the inboard positions of preselected seats.

What is claimed is:

1. A connector module adapted to be integrated into a mobile platform, adjacent to a seat of the mobile platform for connecting portable electronic device to a power source and a network located on-board the mobile platform, the connector module comprising:

a housing;

at least one networking port disposed in the housing adapted to couple the portable electronic device to the network for providing network connectivity of the portable electronic device;

a mechanism slidably connecting said housing to a structure of the seat;

said housing is positionable on said mechanism between one of a stowed position and a deployed position, said housing deployed position having said housing located partially beneath a front beam of said seat and extending at least partially beyond a footprint envelope of said seat.

2. The connector module of claim 1, wherein said mechanism comprises a sliding drawer frame.

3. The connector module of claim 1, wherein said housing is manually positionable between the stowed position an the deployed position.

4. The connector module of claim 1 wherein a power port is disposed in the housing adapted to receive an AC power cable of the portable electronic device for providing power to the portable electronic device.

5. The connector module of claim 1, wherein the at least one networking port comprises both a Universal Serial Bus port and a RJ-45 port.

6. A connector module connectably a ached to a seat of an aircraft for providing for connecting a portable electronic device to power source and a network located on-board the aircraft, the connector module comprising:

a housing slidably connected to a support structure of the seat;

at least one networking port disposed in the housing adapted to couple the portable electronic device to the network for providing network connectivity of the portable electronic device;

a power port disposed in the housing adapted to receive a AC power cable of the portable electronic device for providing power to the portable electronic device;

said housing having a manual pull feature for positioning the housing between one of a stowed position having said housing located entirely beneath a front beam of said seat and within a footprint envelope of said seat to a deployed position having said housing located partially beneath the front beam of said seat and extending at least partially beyond said footprint envelope of said seat and from the deployed position to the stowed position;

a face of said housing for mounting said networking port and said power port; and said face of said housing being visible to a user of said seat when said housing is in the deployed position.

7. The connector module of claim 6, wherein the at least one networking port comprises at least one of a universal serial busport, a RJ-45 port and a 15 volt DC power connector.

8. A connector module adapted to be integrated into a mobile platform, adjacent to a seat of the mobile platform for connecting a portable electronic device to a power source and a network located on-board the mobile platform, the connector module comprising:

a housing;

at least one networking port disposed in the housing adapted to couple the portable electronic device to the network for providing network connectivity of the portable electronic device; and a mechanism slidably connecting said housing to a structure of the seat;

wherein said housing is positionable on said mechanism between one of a stowed position having said housing located entirely beneath a front beam of said seat and within a footprint envelope of said seat, and a deployed position having said housing located partially beneath the front beam of said seat and extending at least partially beyond said footprint envelope of said seat.

9. The connector module of claim 8 wherein said mechanism comprises a sliding drawer frame.

10. The connector module of claim 8 wherein said housing is manually positionable between the stowed position an the deployed position.

11. The connector module of claim 8 wherein a power port is disposed in the housing adapted to receive an AC power cable of the portable electronic device for providing power to the portable electronic device.

12. The connector module of claim 8 herein the at least one networking port comprises both a Universal Serial Bus port an a RJ-45 port.

13. A connector module adapted to be integrated into a mobile platform, adjacent to a seat of the mobile platform for connecting a portable electronic device to a power source and a network located on-board the mobile platform, the connector module comprising:

a housing;

at least one networking port disposed in the housing adapted to couple the portable electronic device to the network for providing network connectivity of the portable electronic device; and a mechanism slidably connecting said housing to a structure of the seat;

wherein said housing is positionable on said mechanism between one of a stowed position having said housing located at least partially beneath a seat bottom cushion of said seat, and a deployed position having said housing located at least partially laterally projecting from said seat bottom cushion, such that said port is accessible by said user.

* * * * *